UNITED STATES PATENT OFFICE.

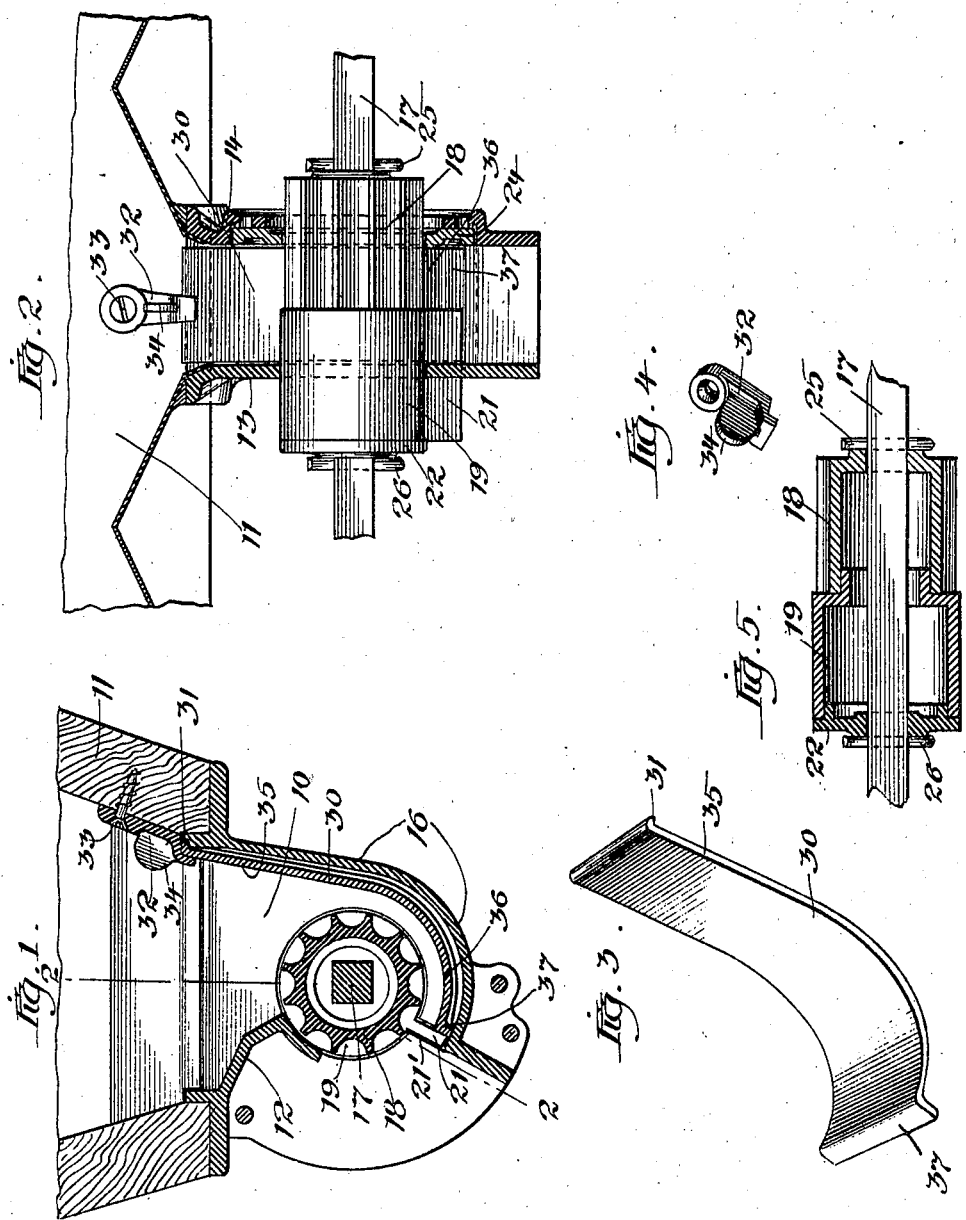

HARRISON B. BOZARD, OF LA CROSSE, WISCONSIN, ASSIGNOR TO LA CROSSE PLOW CO., OF LA CROSSE, WISCONSIN, A CORPORATION OF WISCONSIN.

GRAIN-FEEDING DEVICE.

1,178,571. Specification of Letters Patent. Patented Apr. 11, 1916.

Application filed August 25, 1913. Serial No. 786,388.

*To all whom it may concern:*

Be it known that I, HARRISON B. BOZARD, a resident of La Crosse, in the county of La Crosse and State of Wisconsin, have invented certain new and useful Improvements in Grain-Feeding Devices, of which the following is a full, clear, and exact description.

The invention relates to seeding-machines and more particularly to devices for feeding or distributing and measuring seed. In devices for this purpose, it has long been common to employ a fluted feed-wheel, which together with a cut-off, is laterally adjustable in the cup to vary the width of the seed outlet to correspondingly vary the amount of seed discharged from the outlet of the cup. It has also been proposed to provide adjustable gates by which the height of the discharge opening could be varied to adapt the device for further variation of the area of the seed-outlet, more particularly for the discharge of large and small seeds. These gates were pivotally sustained at or adjacent the lower portion of the cup or case. In these distributing devices, it is very important to avoid any irregularity or pocket in the channel through which the seed is forced, because any irregularity in the surface coöperating with the fluted-wheel to feed and discharge the seed is likely to cause irregular or uneven feeding and discharge of the seed, the seed in the hollow or pocket acting as a retarding surface. In the standard devices in which no pivoted valve or gate is employed, the surface of the cup which coöperates with the fluted wheel in feeding the seed to the discharge-opening was even, and regular feeding has been possible when the surface is formed to gradually approach the periphery of the wheel, but when this surface was formed by an adjustable gate or wall which was movable to vary the height of the outlet, this desired graduation was not retained and this resulted in an irregular seed-channel and irregular discharge of seed, at least, when the adjustable wall was in one of its different positions.

The present invention designs to overcome this objection to the prior adjustable wall in the seed-conduit by providing for variation in the discharge-opening, but preserving the gradually approaching relationship of the wall and the active portion of the feed-wheel in the channel. In other words, the invention designs to meet the desideratum of providing for variability in the height of the discharge-opening, while maintaining evenness of graduation between the feed-wheel and the coöperating wall, at all times.

A further objection to the use of reducing gates, which have been pivoted adjacent the bottom of the cup, is that the connections, particularly where adjustment is infrequently necessary, become clogged or rusted, so that accuracy in adjustment and the feed is not maintained. This objection is more marked when all of the reducer gates are operated by a common shaft.

Another object of the invention is to avoid use of pivotal connections for the reducer-gate, by employment of devices which, when placed in operative position, will insure cleaning out of the cups and attainment of exact uniformity in height of the discharge-openings in an entire series of devices.

The invention further designs to provide a feeding-device with improved means for varying the height of the discharge-opening to vary the discharge of seed.

The invention consists in the novel features hereinafter set forth and more particularly defined by claims at the conclusion hereof.

In the drawings; Figure 1 is a vertical section of a seeding-device embodying the invention. Fig. 2 is a section taken on line 2—2 of Fig. 1. Fig. 3 is a perspective of the removable reducer wall. Fig. 4 is a detail of the keeper for the seed-wall. Fig. 5 is a section through fluted feed-wheel and cut-off sleeve.

The seeding-device comprises a case 10 secured to the bottom of a seed-box 11 from which the seed flows into the top of said case. The case comprises a rear-wall 12, side-walls 13 and 14, and a front and bottom wall 16, all of which may be of the usual construction, as well understood in the art. A shaft 17 extends through the case and usually serves to drive a series of feed-devices and is provided with a fluted feed-wheel 18 which rotates with the shaft. A cut-off comprising a sleeve 19 and a wall 21 is adapted to slide through an opening in the side 13 of the case, being held against rotation by a notch 21' through which wall 21 slides. The cut-off is movable longitudinally with the shaft 17, being held thereon between one end of the feed-wheel 18 and a collar 22.

The collar and said wheel have hubs bearing in the cut-off sleeve and cotter pins 25 and 26 extend through shaft 17 to hold the feed-wheel, the cut-off, and collar 22 in connected relation on the shaft. The shaft is square and passes through correspondingly shaped openings in feed-wheel 18 and collar 22. A rosette ring 24 having an opening corresponding to the fluted periphery of wheel 18, is journaled in side 14 of the case and rotates with the wheel. The cut-off is adapted to vary the width of the discharge opening between the feed-wheel and the rear end of wall 16 and the width of the operative portion of the feed-wheel in the case, as well understood in the art.

The lower portion of wall 16 is curved to conform generally to the outer plane of travel of the outer surface of the feed-wheel 18, so that there will be no substantial unevenness or irregularity in the seed-conduit or passage between the feed-wheel and the coöperating portion of the case, through which the seed is forced to the seed-outlet. The front portion of wall 16 together with the upper portion of the feed-wheel, form a gradually contracting passage for directing the seed to the conduit between the feed-wheel and that portion of the wall 16 which is disposed below the horizontal plane of the axis of the wheel to a point substantially in the vertical plane of the axis of wheel 18 and rearwardly of that point, the bottom wall is substantially concentric with the wheel. Wall 16 is fixed in the case, being usually cast integral with one of the sides of the case. In practice, it has been found that when this fixed or permanent wall is formed, as thus described and so as to avoid any pockets or irregularities, the seed will be evenly fed through the seed conduit and discharged in the desired quantity through the discharge-opening between the lower end of wall 16, the feed-wheel, cut-off wall 21 and the rosette 24. By adjusting the cut-off, the width of the discharge-opening may be varied, but such variation is not sufficient to adapt a single device for the necessary variation desired for entire range of seeds which vary considerably in size.

To provide for reduction in height of the discharge opening, in addition to variation in width, in order to adapt the device for a wide variation of feed of different seeds and to maintain the desired evenness between the feed-wheel and the wall forming the front and bottom of the seed-conduit and to avoid any irregularity by which the regularity of movement of the seed might be disturbed, an auxiliary removable wall or plate is provided which can be inserted into operative position without disturbing or adjusting the fixed wall. This movable wall 30 is adapted to be placed into the case, fits between the sides 13, 14 of the case and extends from the top of wall 16 to the cut-off wall 21. This movable wall is provided with a lip 31 at its upper end which is adapted to rest upon the upper edge of the wall 16 to correctly position it in the case, and may be secured in position by a keeper 32 which is pivoted as at 33 to the seed-box and is adapted to lock the lip down upon the upper edge of wall 16. The keeper may be swung laterally and upwardly to release the wall when it is to be removed. The keeper is provided with a lug 34, so that it can be manipulated by finger pressure. A stiffening rib 30' is formed on wall 30.

The upper portion 35 of the auxiliary wall 30, when secured in the case, gradually approaches the feed-wheel throughout its length and the rear portion 36 which is back of the vertical plane of the axis of wheel 30 is slightly eccentric or flared relatively to the feed-wheel. This slight flare prevents crowding or cramping of the seed when the restricted duct is used, and causes the seed to discharge evenly. Wall or plate 30 terminates in an angular wall 37 at the cut-off wall 21. By this formation of the auxiliary wall, the height of the discharge opening may be reduced to adapt it for feeding different grains or different quantities of grain in connection with the laterally adjustable cut-off whereby the width of the discharge-opening may be varied. An attribute of this auxiliary plate or wall is that the surface which forms the front and bottom of the seed-conduit along which the seed is forced by the feed-wheel is even and graduated with respect to the periphery of the feed-wheel and is devoid of depressions or irregularities, such as result when a pivoted gate in the lower portion of the case is employed. In practice, it has been found that this auxiliary wall will result, not only in reducing the height of the discharge-opening, but will maintain the desired regularity of discharge of feed which is attained by the fixed or permanent wall.

The movable plate or wall 30 is placed into position in the seed-box and may be readily lifted out when the keeper is released.

The invention thus provides an improved seed-distributer or feeding-device in which provision is made for reducing the height of the discharge-opening and which avoids unevenness or pockets or irregularities in the wall along which the seed is forced by the feed-wheel. An important advantage in the use of this supplemental wall is that when it is inserted in the conduit and placed upon the fixed wall, the rear-wall 37 serves, in effect, as a scraper for cleaning the permanent wall 16 as the auxiliary wall is placed in position. Resultantly, all likelihood of the presence of any dust or broken straws or seed in the conduit, likely to prevent the correctness of the position of the auxiliary wall in the conduit, is effectively avoided. Furthermore, the use of hinged joints or pivotal connections which are likely to become corroded or clogged with dirt or dust, so as to prevent the wall from being positioned where it is intended it should be, is also overcome. Furthermore, the removable plate provides a restricted discharge of predetermined accuracy, and guards against difficulty encountered in setting a pivoted gate with accuracy.

The invention thus exemplifies a device in which provision is made for variation of the height of the discharge-opening and in which many of the objections to the employment of an adjustable wall have been effectively overcome.

The invention is not to be understood as restricted to the details set forth, since these may be modified within the scope of the appended claims without departing from the spirit and scope of the invention.

Having thus described the invention, what I claim as new and desire to secure by Letters Patent, is:

1. In a seed-feeding device, the combination of a rotary wheel having means on its periphery for feeding the seed, a seed case having a seed conduit therein and comprising a fixed wall disposed adjacent one side of and curved under the periphery of said wheel and forming a surface coöperating with the wheel and along which the seed is forced by said wheel, and a bodily removable plate adapted to be placed into the seed conduit and interposed between said case wall and said wheel to form a substitute coöperating surface and a restricted seed conduit through which the seed will be forced by the wheel, said plate being rigidly held and immovable relatively to the wheel when disposed in the case.

2. In a seed feeding device, the combination of a rotary wheel having means on its periphery for feeding seed, a seed-case having a seed conduit therein and comprising a fixed wall disposed adjacent one side of and curved under the periphery of said wheel and forming a surface coöperating with the wheel and along which the seed is forced by said wheel, a bodily removable plate adapted to be placed into the seed conduit and interposed between said case wall and said wheel to form a substitute coöperating surface and a restricted seed conduit through which the seed will be forced by the wheel, and means adjacent the upper end of said plate for removably holding it in position in the conduit, said plate being rigidly held and immovable relatively to the wheel when disposed in the case.

3. In a seed-feeding device, the combination of a rotary wheel having means on its periphery for feeding the seed, a seed case having a seed conduit therein and comprising a wall disposed adjacent one side of and below the periphery of said wheel and forming a surface coöperating with the wheel and along which the seed is forced by said wheel, a removable plate adapted to be placed into the seed conduit and interposed between said case-wall and said wheel to form a substitute coöperating surface and a restricted seed conduit through which the seed will be forced by the wheel, and a latch for engaging the upper end of the plate to removably secure it in operative position in the conduit.

4. In a seed feeding device, the combination of a rotary wheel having means on its periphery for feeding the seed, a seed case having a seed conduit therein and comprising a fixed wall disposed adjacent one side of and curved under the periphery of said wheel and forming a surface coöperating with the wheel and along which the seed is forced by said wheel, a bodily removable plate adapted to be placed into the seed conduit and interposed between said case wall and said wheel to form a substitute coöperating surface, a restricted seed conduit through which the seed will be forced by the wheel, said feed-wheel being laterally adjustable in the case, and a cut-off laterally adjustable with said wheel, said plate being rigidly held and immovable relatively to the wheel when disposed in the case.

5. In a seed-feeding device, the combination of a rotary wheel having means on its periphery for feeding the seed, a seed case having a seed conduit therein and comprising a fixed wall disposed adjacent one side of and curved under the periphery of said wheel and forming a surface coöperating with the wheel and along which the seed is forced by said wheel, a bodily removable plate adapted to be placed into the seed conduit and interposed between said case-wall and said wheel to form a substitute coöperating surface and a restricted seed conduit through which the seed will be forced by the wheel, means adjacent the upper end of said plate for removably holding it in position in the conduit, said feed wheel being laterally adjustable in the case, and a cut-off laterally adjustable with said wheel, said plate being rigidly held and immovable relatively to the wheel when disposed in the case.

6. In a seed feeding device, the combination of a rotary wheel having means on its periphery for feeding seed, a seed case having a seed conduit therein and comprising a fixed wall disposed adjacent one side of and curved under the periphery of said wheel and forming a surface coöperating with the wheel and along which the seed is forced by said wheel, a bodily removable plate adapted to be placed into the seed conduit and interposed between said case-wall and said wheel to form a substitute coöperating surface and a restricted seed conduit through which the seed will be forced by the wheel, said feed wheel being laterally adjustable in the case, and a cut-off laterally adjustable with said wheel, said case-wall being extended below the cut-off, and said plate terminating substantially at one side of the cut-off and being rigidly held and immovable relatively to the wall when disposed in the case.

7. In a seed feeding device, the combination of a rotary-wheel having means on its periphery for feeding the seed, a seed case having a seed conduit therein and comprising a fixed wall-disposed adjacent one side of and curved under the periphery of said wheel and forming a surface coöperating with the wheel and along which the seed is forced by said wheel, and a bodily removable plate adapted to be placed into the seed conduit and interposed between said case-wall and said wheel to form a substitute coöperating surface, and a restricted seed conduit through which the seed will be forced by the wheel, said plate extending over substantially the entire area of said coöperating case-wall and being rigidly held and immovable relatively to the wall when disposed in the case.

8. In a seed feeding device, the combination of a rotary wheel having means on its periphery for feeding the seed, a seed-case having a seed-conduit therein and comprising a wall disposed adjacent one side of and below the periphery of said wheel and forming a surface coöperating with the wheel and along which the seed is forced by said wheel, a removable plate adapted to be placed into the seed conduit and interposed between said case-wall and said wheel to form a substitute coöperating surface and a restricted seed conduit through which the seed will be forced by the wheel, said feed-wheel being laterally adjustable in the case, and a cut-off laterally adjustable with said wheel, said plate being extended to engage and be held by the cut-off.

9. In a seed feeding device, the combination of a rotary-wheel having means on its periphery for feeding the seed, a seed case having a seed conduit therein and comprising a wall disposed adjacent one side of and below the periphery of said wheel and forming a surface coöperating with the wheel and along which the seed is forced by said wheel, a removable plate adapted to be placed into the seed conduit and interposed between said case-wall and said wheel to form a substitute coöperating surface and a restricted seed conduit through which the seed will be forced by the wheel, said feed-wheel being laterally adjustable in the case, and a cut-off laterally adjustable with said wheel, said plate having a downwardly extending flange at the cut-off.

10. In a seed-distributer, the combination of an externally fluted rotary feed-wheel, a seed-case in which said wheel rotates, provided with a discharge-opening and having a conduit therein and comprising a fixed wall coöperating with the periphery of the wheel to conduct the seed to said opening, and a bodily movable plate for reducing the area of the seed-conduit having the upper portion of its surface formed to gradually approach the feed-wheel to the vertical plane of the wheel axis and a slightly flared portion beyond said plane and being fixed so that it is immovable relatively to the feed-wheel when placed in the case, said fixed wall of the case being curved under said plate.

11. In a seed-distributer, the combination of an externally fluted rotary-feed-wheel, a seed-case in which said wheel rotates, provided with a discharge-opening and having a conduit therein and comprising a fixed wall coöperating with the periphery of the wheel to conduct the seed to said opening, said feed-wheel being laterally adjustable, a variable cut-off, and a bodily movable plate for reducing the area of the seed-conduit having the upper portion of its surface formed to gradually approach the feed-wheel and a slightly flared portion at its other end and being fixed so that it is immovable relatively to the feed-wheel when placed in the case, said fixed wall of the case being curved under said plate.

HARRISON B. BOZARD.

Witnesses:
H. W. ROBINSON,
C. W. DICKINSON.